(12) United States Patent
Pearson et al.

(10) Patent No.: US 9,683,363 B2
(45) Date of Patent: Jun. 20, 2017

(54) SYSTEM AND METHOD OF ATTACHING AND SUPPORTING SOUND REDUCTION OR THERMAL INSULATION BLANKETS TO METALLIC MACHINERY OR STRUCTURAL FRAMES

(71) Applicant: SYSTÈMES DE CONTRÔLE ACTIF SOFT DB INC., Quebec (CA)

(72) Inventors: Michel Pearson, Quebec (CA); André L'Espérance, Quebec (CA)

(73) Assignee: SYSTÈMES DE CONTRÔLE ACTIF SOFT DB INC., Québec (CA)

( * ) Notice: Subject to any disclaimer, the term of this patent is extended or adjusted under 35 U.S.C. 154(b) by 0 days.

(21) Appl. No.: 14/791,816

(22) Filed: Jul. 6, 2015

(65) Prior Publication Data

US 2016/0002915 A1   Jan. 7, 2016

Related U.S. Application Data

(60) Provisional application No. 62/021,374, filed on Jul. 7, 2014.

(51) Int. Cl.
| | | |
|---|---|---|
| *E04B 2/00* | (2006.01) | |
| *E04B 1/82* | (2006.01) | |
| *G10K 11/16* | (2006.01) | |
| *F16B 1/00* | (2006.01) | |
| *F16B 5/06* | (2006.01) | |

(52) U.S. Cl.
CPC ............ *E04B 1/8218* (2013.01); *G10K 11/16* (2013.01); *E04B 2001/8263* (2013.01); *F16B 5/0692* (2013.01); *F16B 2001/0035* (2013.01)

(58) Field of Classification Search
CPC .......... E04B 1/8218; E04B 2001/8263; G10K 11/16; F16B 2001/0035
USPC ................. 52/506.05, 238.1; 248/206.5, 558
See application file for complete search history.

(56) References Cited

U.S. PATENT DOCUMENTS

| | | | | | |
|---|---|---|---|---|---|
| 3,518,884 | A | * | 7/1970 | Wood, Jr. ................. | G01K 1/14 248/206.5 |
| 4,287,676 | A | * | 9/1981 | Weinhaus ................. | G09F 7/18 248/206.5 |
| 4,830,322 | A | * | 5/1989 | Gary ........................ | A47G 1/21 211/45 |
| 4,835,923 | A | * | 6/1989 | Ybarra .................. | E04B 2/7409 52/238.1 |

(Continued)

OTHER PUBLICATIONS

Acoustical Solutions Inc, Technical Data Sheet, "Audioseal™ Combination Blanket ABSC-26", in https://acousticalsolutions.com/wp-content/uploads/2015/01/14751394201546.pdf; 2015.

*Primary Examiner* — Basil Katcheves
(74) *Attorney, Agent, or Firm* — Gwendoline Bruneau

(57) ABSTRACT

A blanket enclosure for a metallic piece of equipment and a method of fabrication, comprising at least one blanket panel and at least one magnetic support supporting the blanket panel, the magnetic support comprising at least one magnet, the at least one magnet connecting the blanket panel to a surface of the metallic piece of equipment. The method of fabrication comprises providing at least one blanket panel, providing at least one support comprising at least one magnet, supporting the blanket panel by the support, and contacting the magnet of the support supporting the blanket panel to a surface of the metallic piece of equipment.

12 Claims, 16 Drawing Sheets

(56) References Cited

U.S. PATENT DOCUMENTS

| | | | | |
|---|---|---|---|---|
| 4,934,119 A * | 6/1990 | Ybarra | ............. | E04B 2/7409 52/238.1 |
| 5,931,316 A * | 8/1999 | Carpinelli | ............. | A47F 7/14 108/26 |
| 6,055,774 A * | 5/2000 | Muddiman | ............. | E05B 65/102 49/141 |
| 6,155,523 A * | 12/2000 | Pitre | ............. | A47H 1/14 248/206.5 |
| 6,216,888 B1 * | 4/2001 | Chien | ............. | B23Q 3/1546 211/70.6 |
| 6,318,569 B1 * | 11/2001 | Rothing | ............. | A47B 96/027 108/152 |
| 7,145,425 B2 * | 12/2006 | Clement | ............. | A47G 1/17 335/285 |
| 7,374,052 B2 * | 5/2008 | Price | ............. | A47F 5/00 211/103 |
| 8,042,308 B2 * | 10/2011 | Sullivan | ............. | G09F 7/18 434/408 |
| 9,140,017 B1 * | 9/2015 | Oliver | ............. | E04F 13/075 |
| 2011/0011994 A1 * | 1/2011 | Ahlstrom | ............. | A47G 1/168 248/205.4 |
| 2013/0291366 A1 * | 11/2013 | Hoffman | ............. | F16B 35/04 29/525.02 |
| 2013/0302085 A1 * | 11/2013 | King | ............. | A47B 87/002 403/188 |
| 2014/0263895 A1 * | 9/2014 | Dickenson | ............. | B60R 13/0206 248/206.5 |
| 2015/0352889 A1 * | 12/2015 | Quinones | ............. | F16M 13/02 248/467 |
| 2015/0375152 A1 * | 12/2015 | Simmons | ............. | E06B 9/01 55/491 |
| 2016/0052095 A1 * | 2/2016 | Simmons | ............. | B01D 46/0005 29/281.5 |
| 2016/0061380 A1 * | 3/2016 | Smith | ............. | F16M 13/022 248/558 |

* cited by examiner

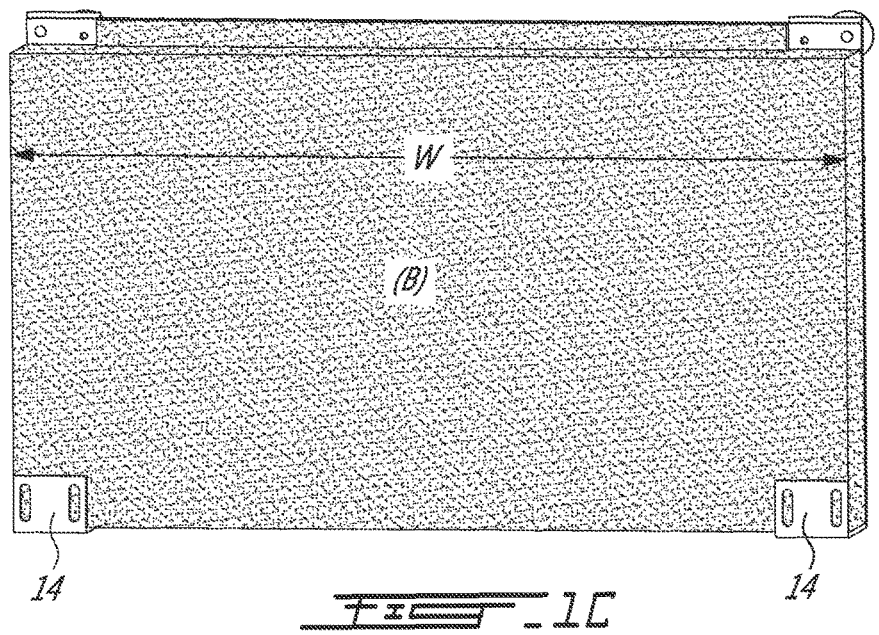
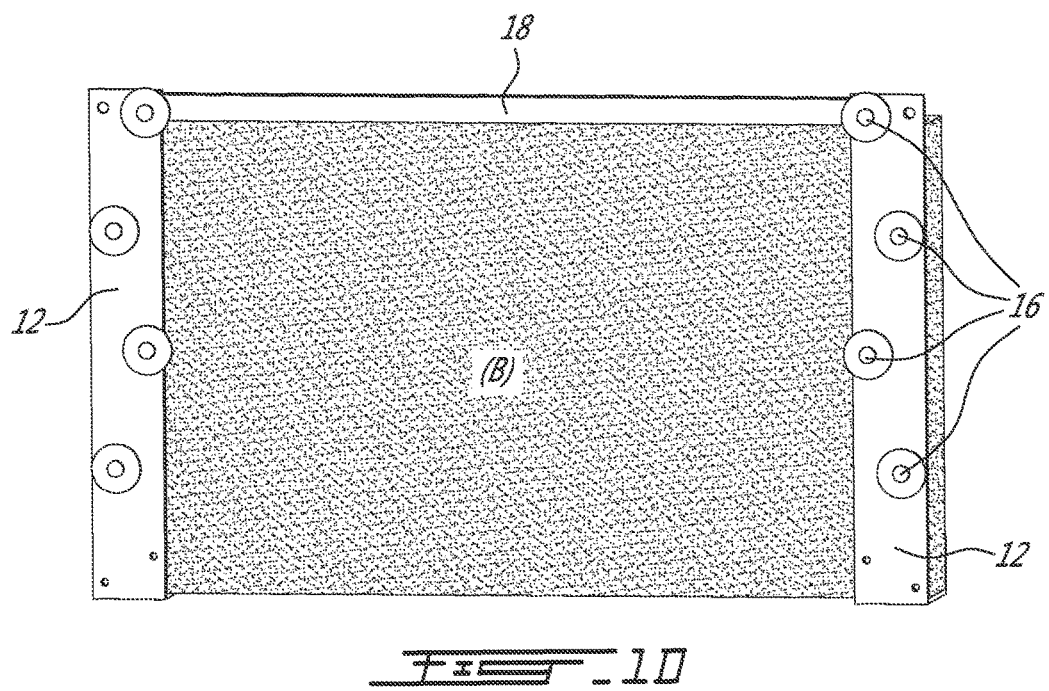

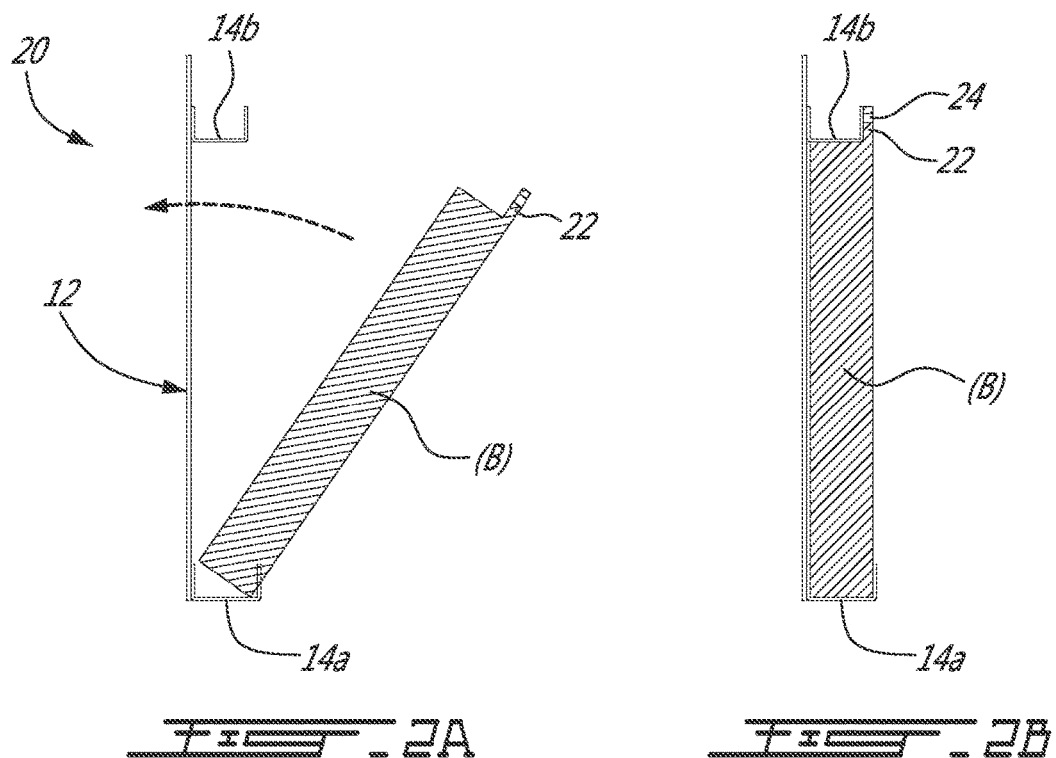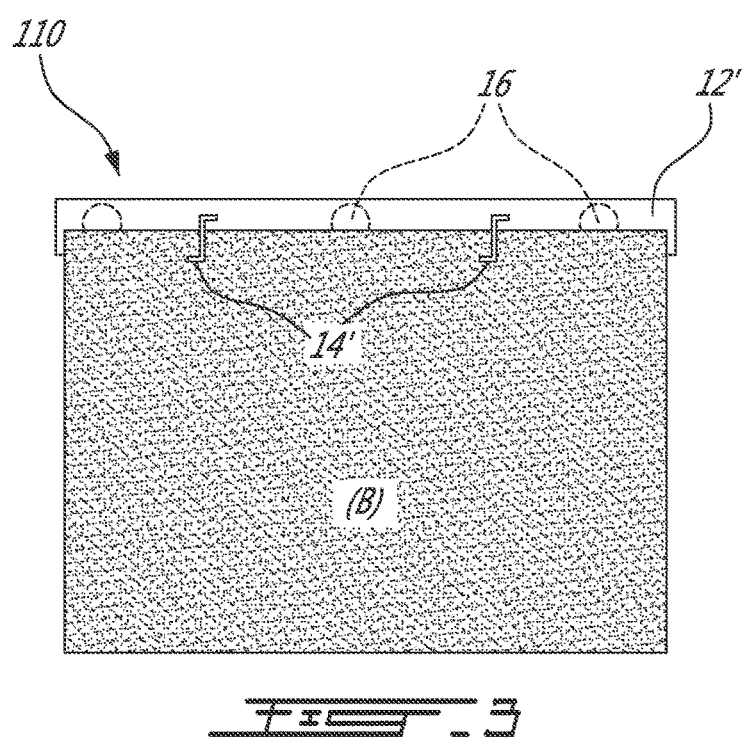

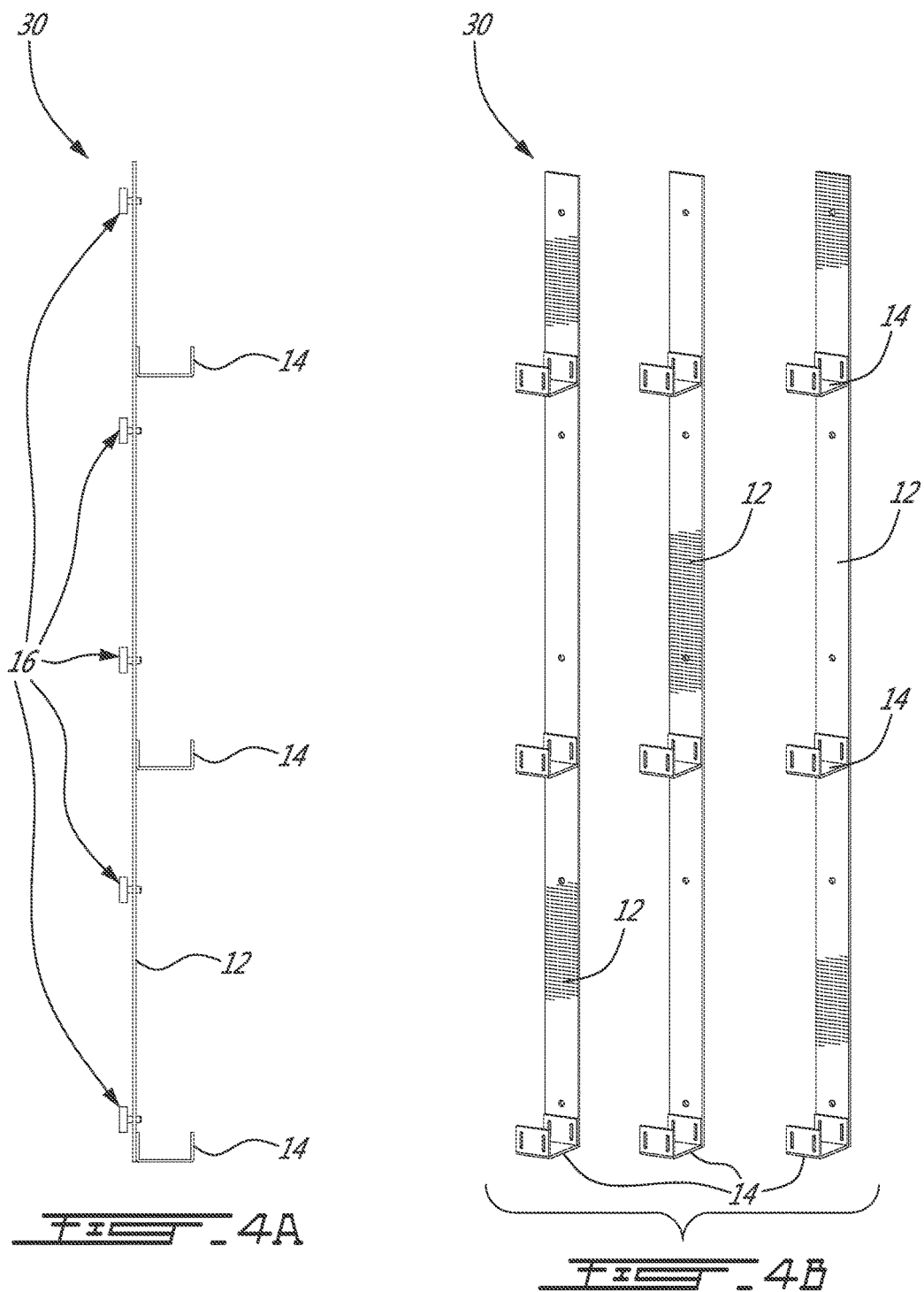

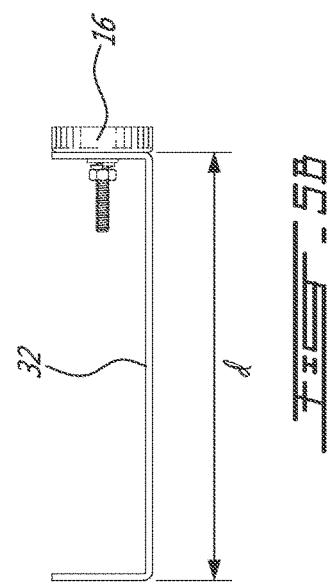
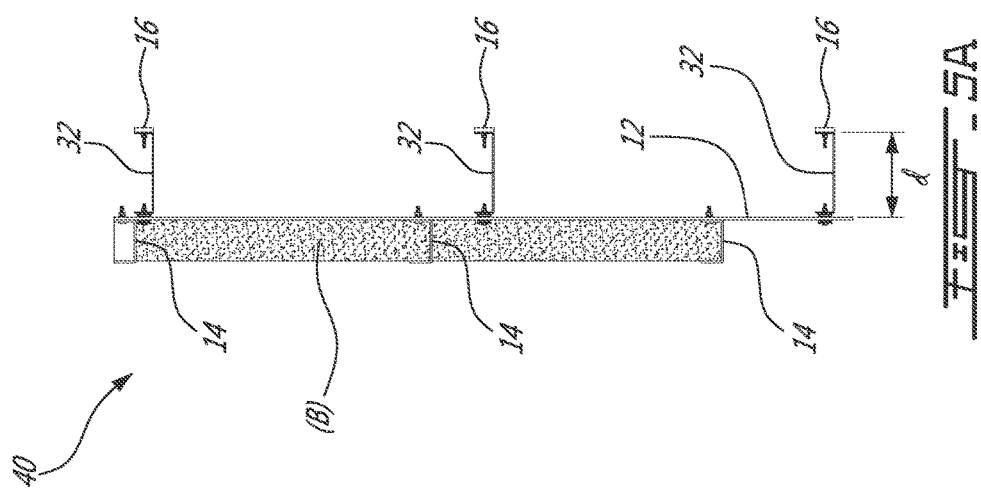

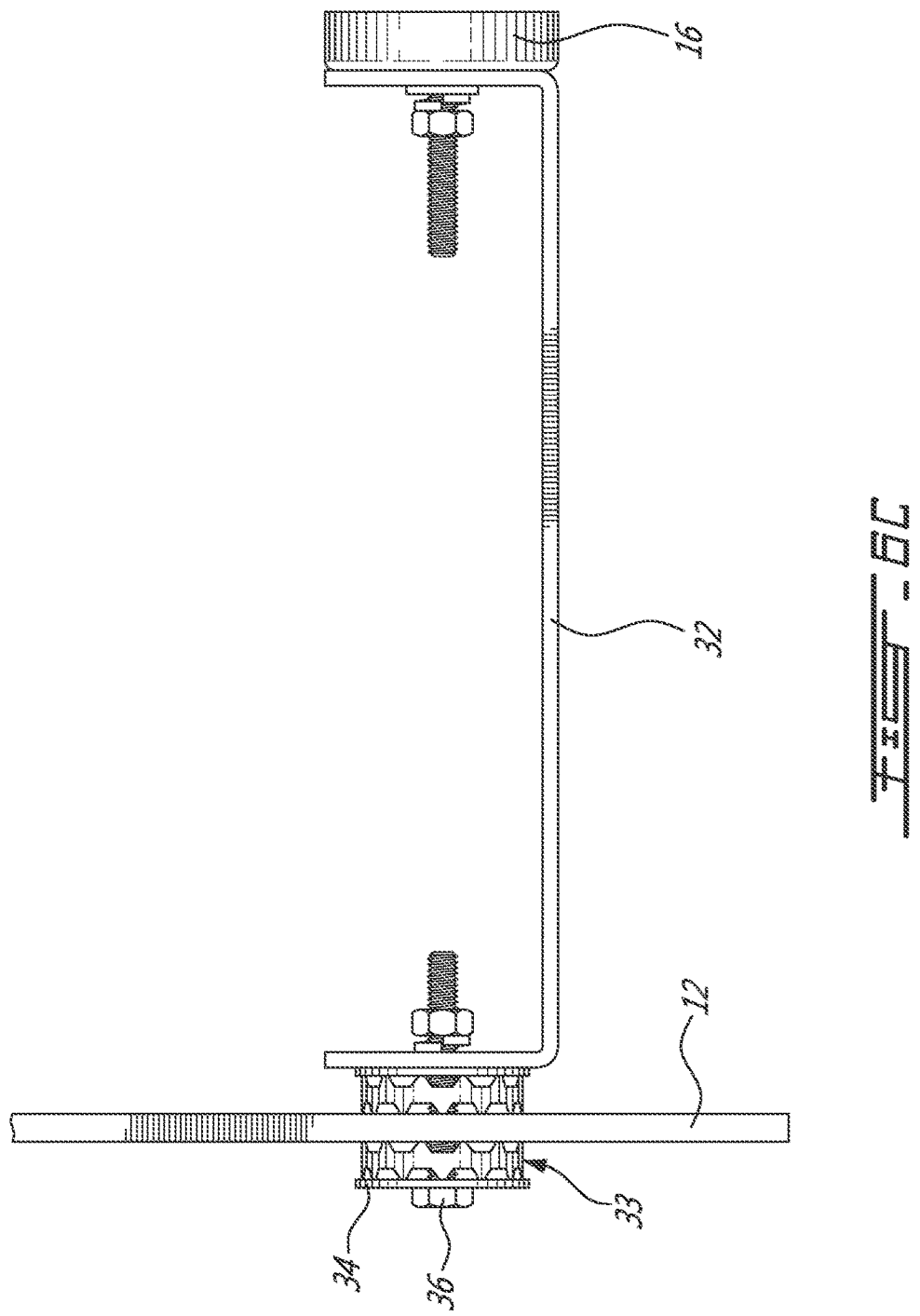

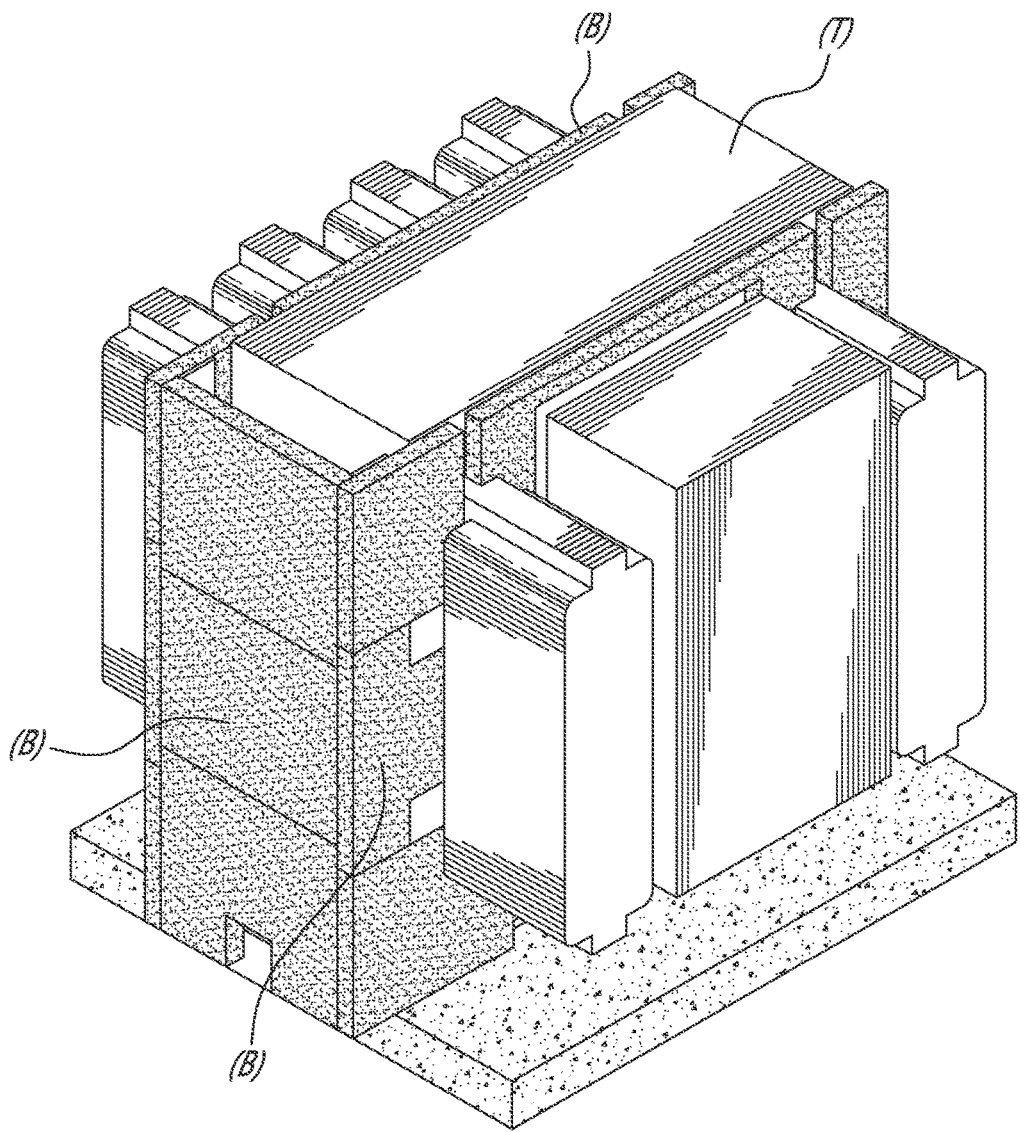

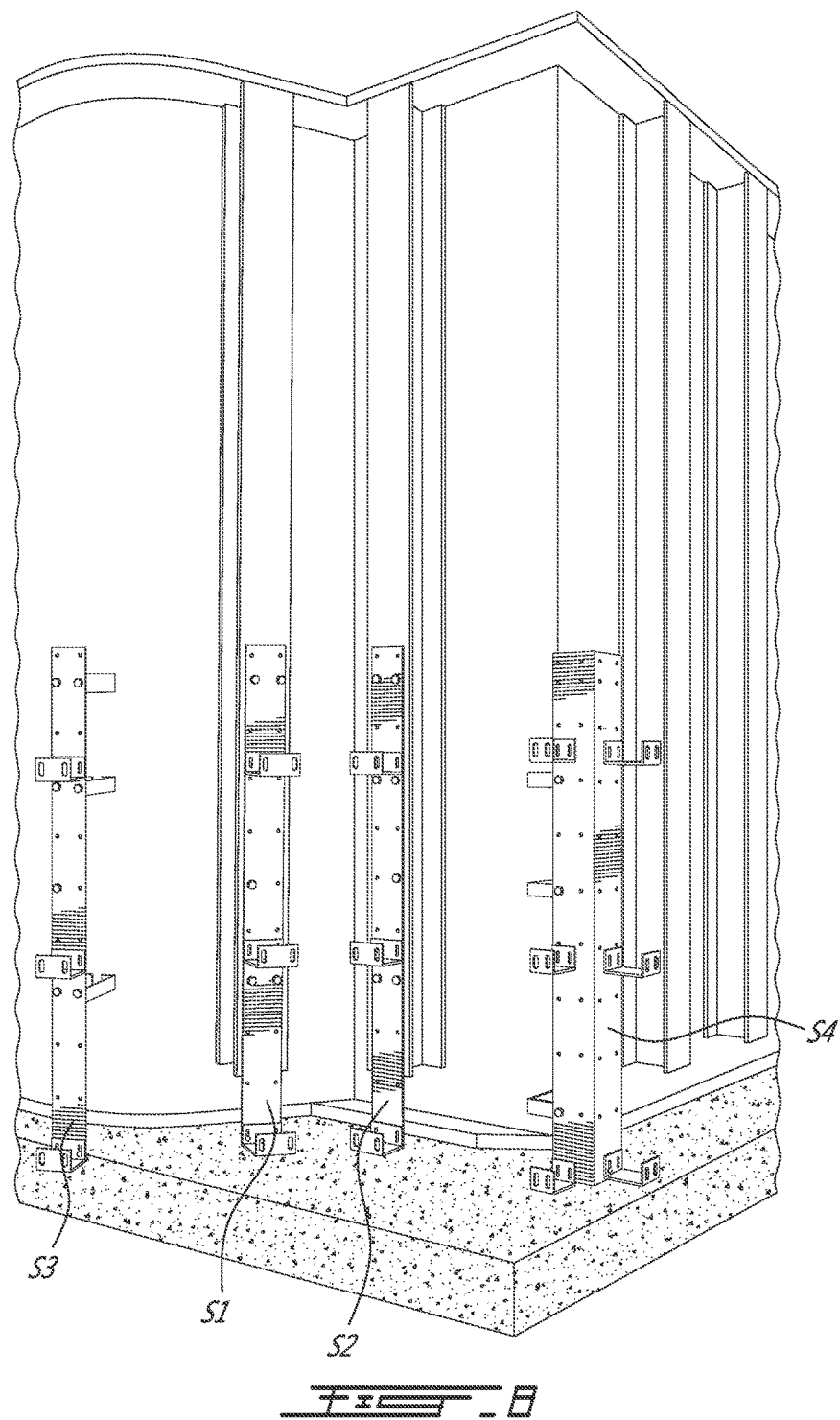

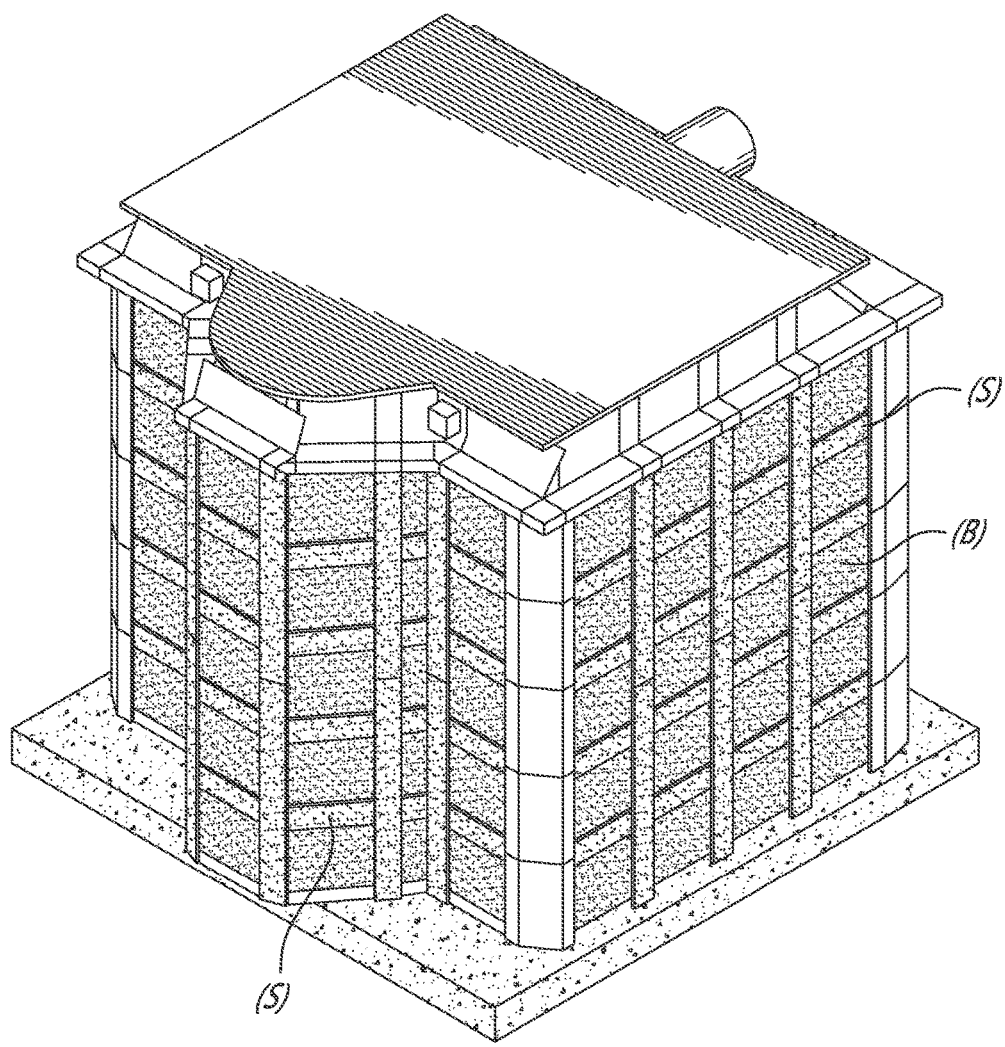

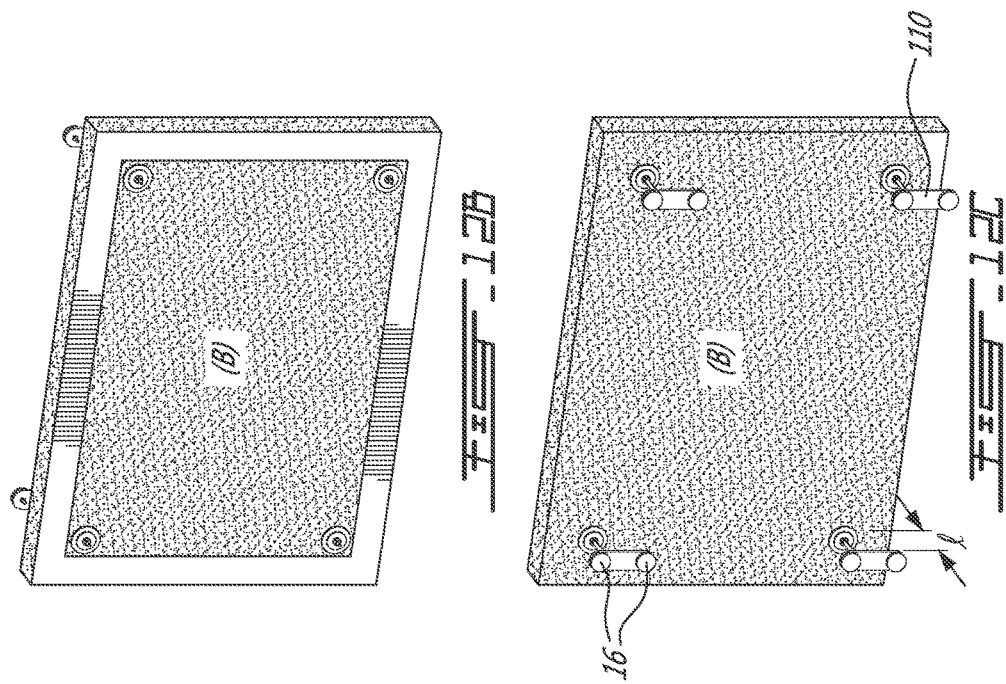
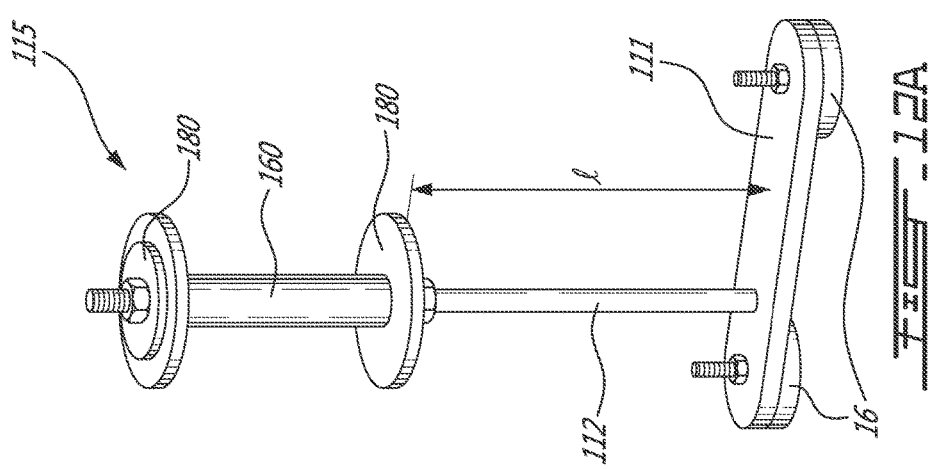

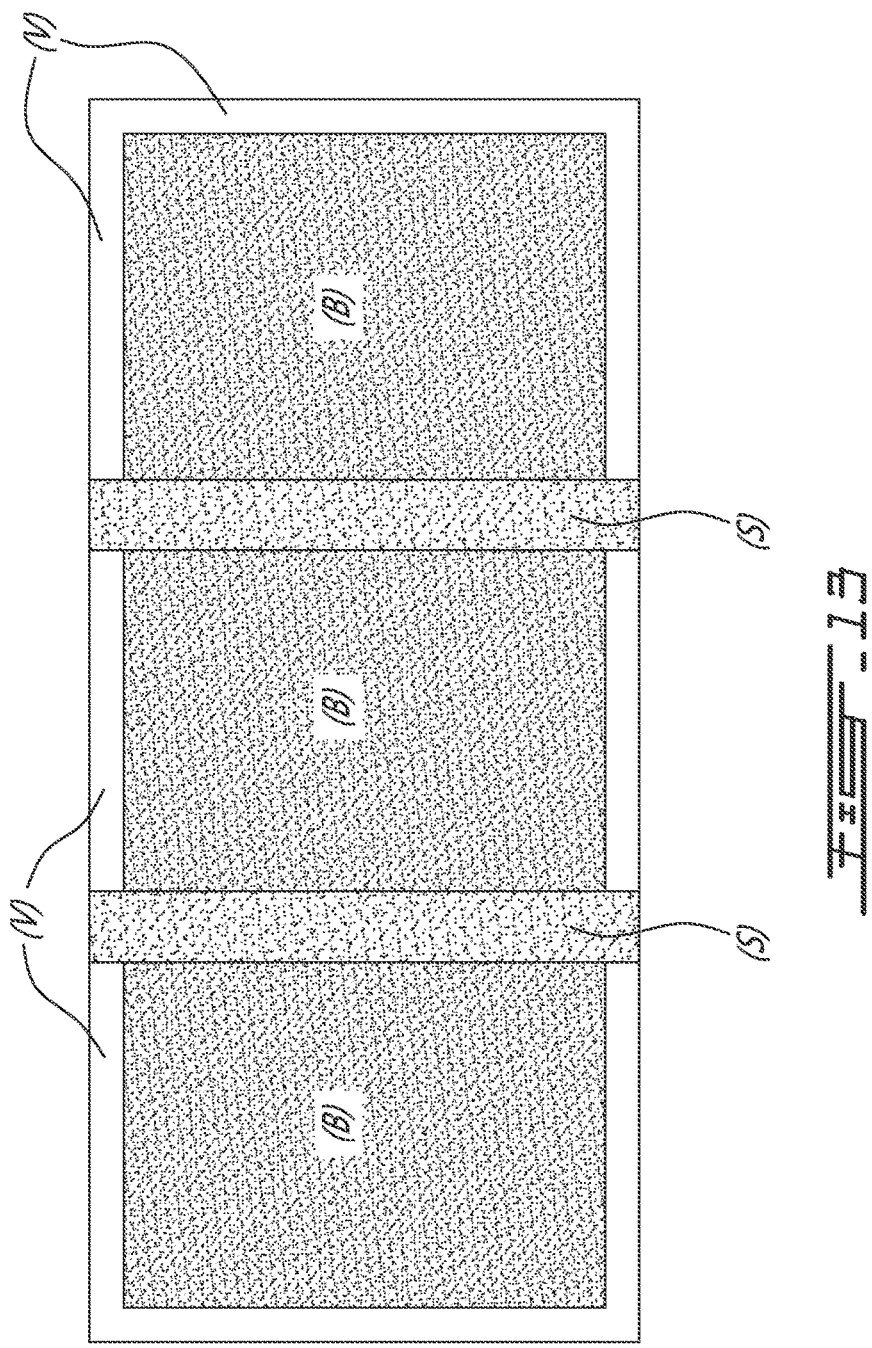

SYSTEM AND METHOD OF ATTACHING AND SUPPORTING SOUND REDUCTION OR THERMAL INSULATION BLANKETS TO METALLIC MACHINERY OR STRUCTURAL FRAMES

CROSS REFERENCE TO RELATED APPLICATIONS

This application claims benefit of U.S. provisional application Ser. No. 62/021,374, filed on Jul. 7, 2014. All documents above are incorporated herein in their entirety by reference.

FIELD OF THE INVENTION

The present invention relates to a system and method for mounting and securing in place sound-reducing or thermally-insulating blankets in close contact with machinery or electrical equipment comprising metallic components or external structures.

BACKGROUND OF THE INVENTION

In terms of sound reduction from machinery, noise generated by industrial or commercial machinery typically comes from kinetic, combustion, or turbulence-related operations. These noises are reduced by the manufacturer either through considerate design or enclosure of the individual sources within the structure of the machine. Ventilation requirements mean that air gaps commonly exist through which sound can break-out. Silencers or mufflers can be fitted to reduce these noise pathways.

A pathway for noise transfer is the radiation of noise into the external structure or skin of the machinery, typically thin metal panels which re-radiate noise into the environment. A similar process of re-radiation of airborne or structure-borne noise occurs within some electrical equipment also contained within metallic structures. Whilst this external skin can be acoustically enhanced, unless there is a specific reason for doing so then cost, weight, and size requirements mean that typically only singular metal panels are used as an external skin on most machinery and electrical structures. As a result, remedial noise control measures need to be employed if the machinery or electrical noise is affecting a noise-sensitive receptor.

Currently employed generic methods of externally addressing mechanical or electrical parts noise include providing silencers or mufflers for ventilation noise as mentioned hereinabove; applying constrained or unconstrained damping coatings to structural panels, including the external skin of parts; complete acoustic enclosures constructed from high-mass materials such as concrete or metal, or using limp wall techniques using two thin plates separated by a viscous material for example; partially-enclosing noise barriers or walls, which may be solid, for prevention of noise transmission, or absorbent, for noise absorption; and ground/slab vibration isolation. Active noise control, by phase cancellation, may also be contemplated.

In addition to these methods, enclosures made of acoustic blankets have been used to enclose machinery to reduce noise breakout from acoustically radiating surfaces, such as metal panels, etc. Such acoustic enclosures typically have noise blocking or absorption qualities, or both.

For a flexible acoustic cover in direct contact with the noise source, different textiles, fabrics and materials are often combined to form a sound-insulating cover directly wrapped around the noise source. Such composite covers typically consist of outer protective fabric layers, typically fiberglass or canvas, and an inner absorptive layer, such as mineral wool, glass fiber, or foam for example, when attempting to reduce medium to high frequency noise. Additionally, some covers include an inner heavier mass layer, such as limp mass PVC loaded with lead or sheet steel, and then potentially a further absorptive layer for example, to reduce sound at lower frequencies. A number of companies manufacture variants on this design of acoustic cover.

Adhesives, Velcro overlaps, sewn-in cord tie-backs, quick-release clips, and/or overlapping eyelets for cord or cable-tie anchorage are mainly used for attaching acoustic blankets to a piece of equipment or machine. Alternately, a frame made of vertical posts standing from the ground and supporting horizontal cross bars is erected around the allowing and used to hang acoustic blankets.

There is still a need in the art for a method of attaching and supporting sound reduction or thermal insulation blankets to metallic machinery or structural frames.

SUMMARY OF THE INVENTION

More specifically, in accordance with the present invention, there is provided a blanket enclosure for a metallic piece of equipment, comprising at least one blanket panel and at least one magnetic support supporting the blanket panel, said magnetic support comprising at least one magnet connecting the supported blanket panel to a surface of the metallic piece of equipment.

There is further provided a method for making a blanket enclosure for a metallic piece of equipment, comprising providing at least one blanket panel, providing at least one support comprising at least one magnet, supporting the blanket panel by the support; and contacting the magnet of the support supporting the blanket panel to a surface of the metallic piece of equipment.

There is further provided a support for securing a blanket panel to a metallic piece of equipment, comprising at least one supporting element and at least one magnet, the supporting element supporting the blanket panel and the magnet connecting the blanket panel to a surface of the metallic piece of equipment, a distance between the supporting element and the magnet being adjustable.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1C shows an acoustic blanket panel supported of the first side of the support of FIG. 1A according to an embodiment of an aspect of the present invention;

FIG. 1D shows the acoustic blanket panel of FIG. 1D from the second side of the support;

FIGS. 2A and 2B show steps of assembly of a blanket panel with a support according to an embodiment of an aspect of the present invention;

FIG. 3 shows a support according to an embodiment of an aspect of the present invention;

FIG. 4A is a side view of a support according to an embodiment of an aspect of the present invention;

FIG. 4B is a perspective view of the support of FIG. 4A;

FIG. 5A is a side view of a support according to an embodiment of an aspect of the present invention;

FIG. 5B shows an extension arm of the support of FIG. 5A;

FIG. 6C shows a connection between a magnet and a vertical plate of a support according to an embodiment of an aspect of the present invention;

FIG. 7 is a perspective view of a blanket enclosure for a transformer according to an embodiment of an aspect of the present invention;

FIG. 8 is a photograph of supports according to embodiments of an aspect of the present invention;

FIG. 9C is a perspective first side view of a blanket enclosure according to an embodiment of an aspect of the present invention;

FIG. 9D is a perspective second side view of the blanket enclosure of FIG. 9C;

FIG. 12A shows a support according to an embodiment of an aspect of the present invention;

FIGS. 12B is a perspective view of a blanket panel showing an outer face thereof;

FIG. 12C is a perspective view of the blanket panel of FIG. 12B showing an inner face; and FIG. 13 shows an assembly of three overlapping blanket panels into a continuous barrier according to an embodiment of an aspect of the present invention.

DESCRIPTION OF THE INVENTION

The present invention is illustrated in further detail by the following non-limiting examples.

There is generally provided a method and a system for reducing noise breakout from outdoor or indoor mechanical or electrical equipment comprising metallic external structures using acoustic blanket enclosures, directly affixed to, or at least partially offset from, the metallic structures of the mechanical or electrical equipment.

The following will be described in relation to acoustic enclosures for illustration purposes, but the present method and system apply for thermal enclosures for thermal insulation of outdoor or indoor mechanical or electrical equipment comprising metallic external structures using thermal insulation blankets. Thermal blankets are typically used in industrial settings to reduce heat loss of machinery and/or to protect workers from the heat for example.

FIGS. 1 illustrate a support 10 for an acoustic blanket panel according to an embodiment of an aspect of the present invention.

Figure 1A:
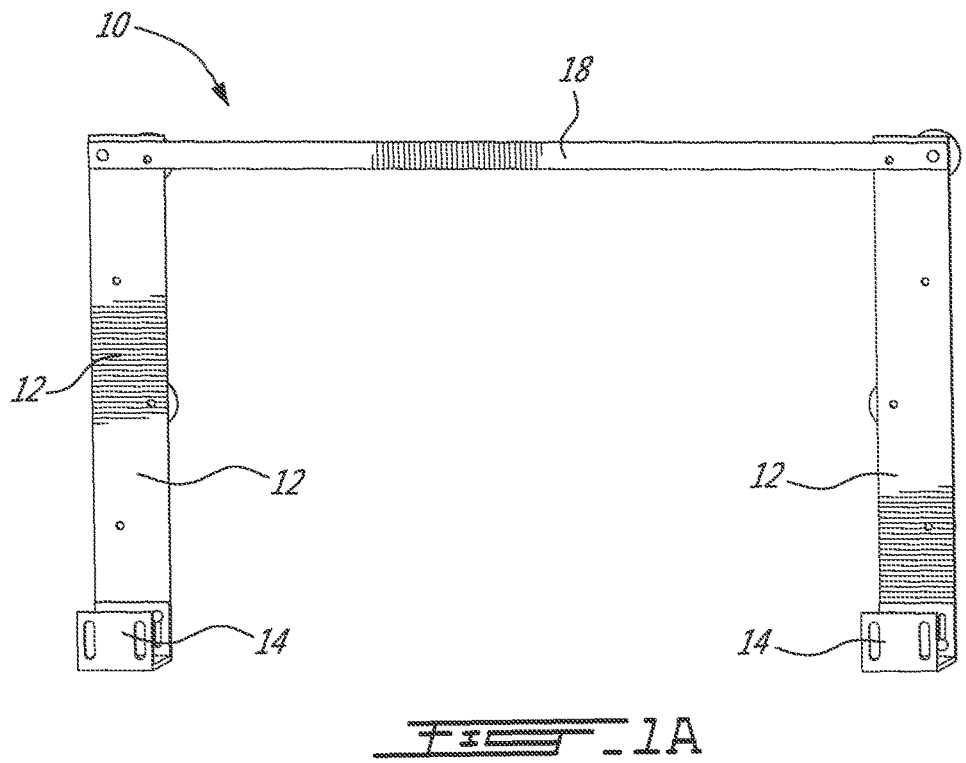
FIG. 1A shows a first side of a support according to an embodiment of an aspect of the present invention.
Figure 1B:
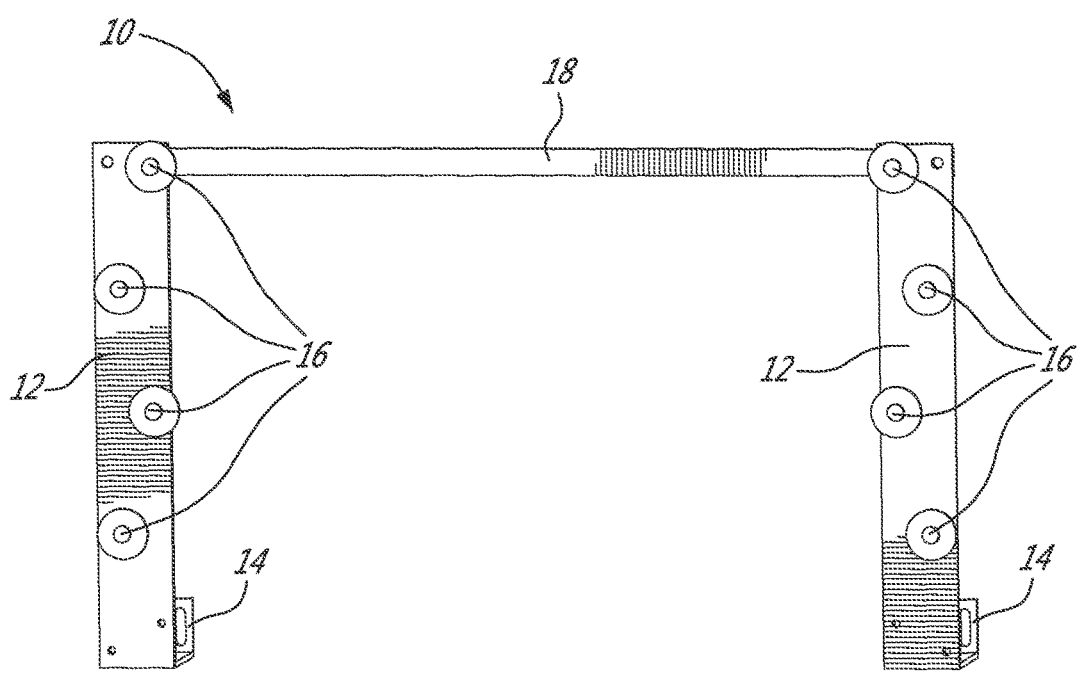
FIG. 1B shows a second side of the support of FIG. 1A according to an embodiment of an aspect of the present invention.

As illustrated in this embodiment, the support 10 generally comprises two spaced-apart vertical plates 12, each supporting a bracket 14, shown at a bottom end thereof in FIGS. 1A and 1C for example, on a first side thereof, and magnets 16 of the second side thereof (see FIGS. 1B and 1D for example). A horizontal cross bar 18 may be provided between the two vertical plates 12. As shown in FIG. 1C, an acoustic blanket panel (B) is positioned so that its bottom edge is supported, at each extremity thereof in the illustrated example, within the brackets 14 of the two spaced vertical plates 12, its lateral edges resting against the surface of the vertical plates 12. The top edge of the blanket panel (B) may be secured to both vertical plates 12 using a horizontal cross bar passing through a sleeve (not shown) provided in the top edge of the blanket panel (B) and fastened to the vertical plates 12 for example.

Once thus secured within the support 10 (see FIG. 1C), the blanket panel may thus be positioned in direct contact with a piece of metallic equipment by positioning the magnets 16 on the second side of the support in contact with the piece of metallic equipment (see FIG. 1D).

The vertical plates 12 may be of adjustable height so as to be adjusted to blanket panels (B) of different heights, and the distance separating them may be varied according to the width of the blanket panel (B) to be supported.

FIG. 2A shows a side view of a support 20 according to an embodiment of an aspect of the present invention. Each one of the two spaced vertical plates 12 supports in this case two brackets separated along the height of the vertical plates 12 by a distance generally corresponding to the height of a blanket panel (B) to be supported. The bottom edge of the blanket panel (B) may thus be positioned within the bottom brackets 14a (see FIG. 2A) and then tilted back up so that its top edge reaches the underneath of the top bracket 14b. The top edge of the blanket panel (B) may then be secured to the top bracket 14b by a screw and bolt unit 24 for example, passing through an hem 22 provided at the top edge of the blanket panel (B) and through the surface of the bracket 14b (see FIG. 2B) for example.

The support may comprise one single vertical plate 12, comprising a bracket 14. The bracket may support the blanket panel (B) from an upper edge of the blanket panel (B), or from a side edge of the blanket panel (B), instead of from the bottom edge thereof as illustrated in FIGS. 1 and 2 for example.

Alternatively, the support may comprise a horizontal plate, the horizontal plate comprising least one bracket on the first side thereof and at least one magnet on the second side thereof. FIG. 3 for example shows a support 110 comprising a horizontal plate 12' with, on a first side thereof, two brackets 14', and three magnets 16 on the second side thereof. An acoustic blanket panel (B) is supported by its top edge by the brackets 14'.

FIGS. 4 show an example of a long support with multiple brackets to support a number of blanket panels according to an embodiment of an aspect of the present invention. FIG. 4A is a side view of a support 30, showing a vertical plate 12 supporting brackets 14 at different levels along its height, on a first side thereof, and magnets 16 of the second side thereof. FIG. 4B shows a perspective view of the support 30, comprising three spaced such vertical plates 12. As mentioned in relation to FIGS. 1, a horizontal cross bar (not shown), or a plurality thereof, may be provided between the vertical plates 12. Various arrangements of such support may be tailored to support multiple blanket panels when large surfaces of mechanical or electrical equipment have to be covered.

The distance between the mechanical or electrical equipment and the blanket panels may be adjusted.

FIGS. 5 for example show a support 40 according to an embodiment of an aspect of the present invention, holding a blanket (panel B) on a first side thereof as described hereinabove, and provided, on the second opposite side thereof, with magnets 16 supported at a distance (d) from the surface of this second side. As best seen in FIG. 5B, each magnet 16 is supported at a free end of an extension arm 32 of a length (d), secured at its opposite end to the vertical plate 12, using bolts and screws for example.

Figure 6A:
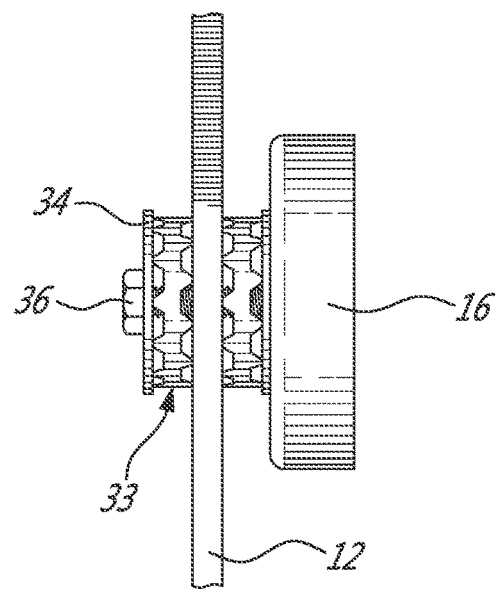
FIG. 6A shows a connection between a magnet and a vertical plate of a support according to an embodiment of an aspect of the present invention.

The magnets 16 may be secured to the vertical plates 12 using anti-vibration mounts 33 with wash 34 and nut 36 according to embodiments of an aspect of the present invention. The anti-vibration mount may be installed directly to the vertical plate (FIG. 6A), with an extended nut (FIG. 6B) or with an extended arm (FIG. 6C). Anti-vibration mounts are typically used to reduce the transmission of the vibration of the machinery to the support in order to minimize the structure-born noise that can be generated by the support and/or the blanket panel itself. In FIG. 6A the magnet 16 is mounted directly on the plate 12, while in FIG. 6B an extended nut 36' is used, which allows distancing the magnet 16 a short distance $\epsilon$, corresponding to the length $\epsilon$ of the extended nut 36', away from the plate 12, allowing a blanket panel to be positioned a distance away from the surface of the piece of mechanical or electrical equipment. FIG. 6C shows use of such anti-vibration mounts 33 with wash 34 and nut 36 when using the extension arm 32 discussed hereinabove in relation to FIGS. 5, allowing a blanket panel to be positioned a greater distance away from the surface of the piece of mechanical or electrical equipment.

Figure 6B:
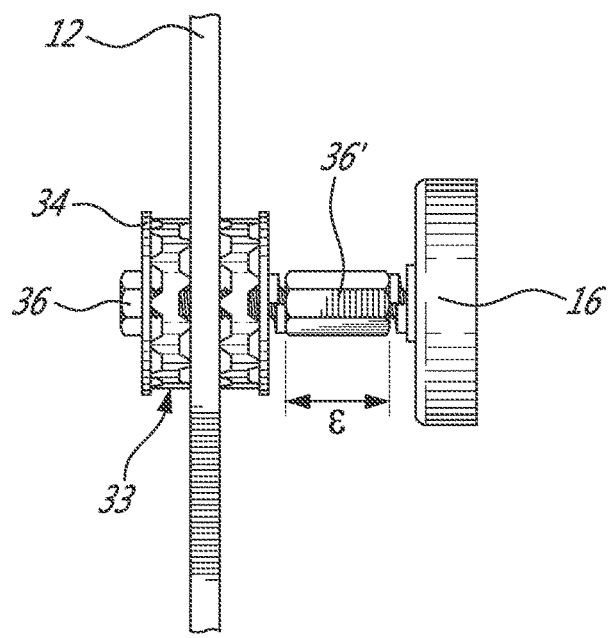
FIG. 6B shows a connection between a magnet and a vertical plate of a support according to an embodiment of an aspect of the present invention.

Adjusting the distance between the blanket panels and the piece of mechanical or electrical equipment, as discussed for example in relation to FIGS. 6B, 5 and 6C, allows flexibility in setting the blanket enclosure around the machine, which may be surrounded by a number of other pieces of equipment for example. It also allows selecting a desired distance between the blanket enclosure and the piece of mechanical or electrical equipment and/or to different parts of the piece of mechanical or electrical equipment, corresponding to a target air circulation therebetween to prevent overheating of the piece of equipment, or parts thereof, when required.

The support, i.e. vertical plates, brackets and cross bars if any, may be made in metal, aluminium, plastic or other rigid material.

The supports as described hereinabove allow combining separate blanket panels into a continuous flexible modular barrier enclosure around one of more sides of a machinery or electrical equipment, as shown in FIGS. 7 and 8 in the case of a power transformer for example.

FIG. 7 shows an example of an electric transformer (T, shown in dark), with blankets (B) on three sides thereof (B). In this case, the blanket panels (B) are positioned at a greater distance from the surface of the transformer at the front of the figure than the blanket panels (B) on side parts of the transformer.

FIG. 8 shows supports of the present invention, positioned in contact with surfaces of a structure (see S1, S2 for example), at a distance therefrom (see S3 for example), at an angle (see S4 for example).

Figure 9B:
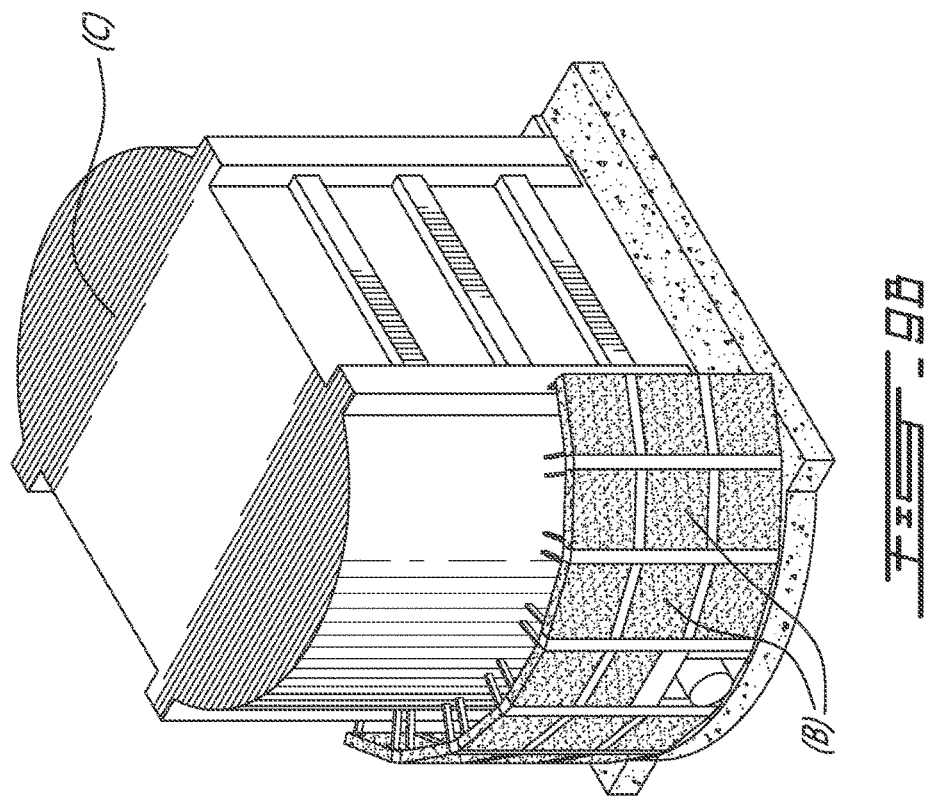
FIG. 9B is a perspective view of the blanket enclosure of FIG. 9A.
Figure 9A:
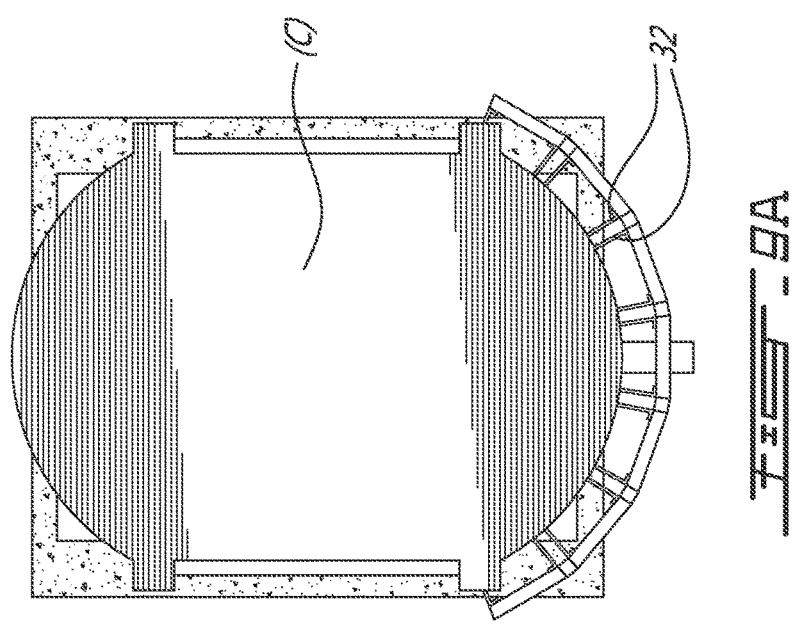
FIG. 9A shows a top view of a partial blanket enclosure for a cradle according to an embodiment of an aspect of the present invention.
Figure 90:
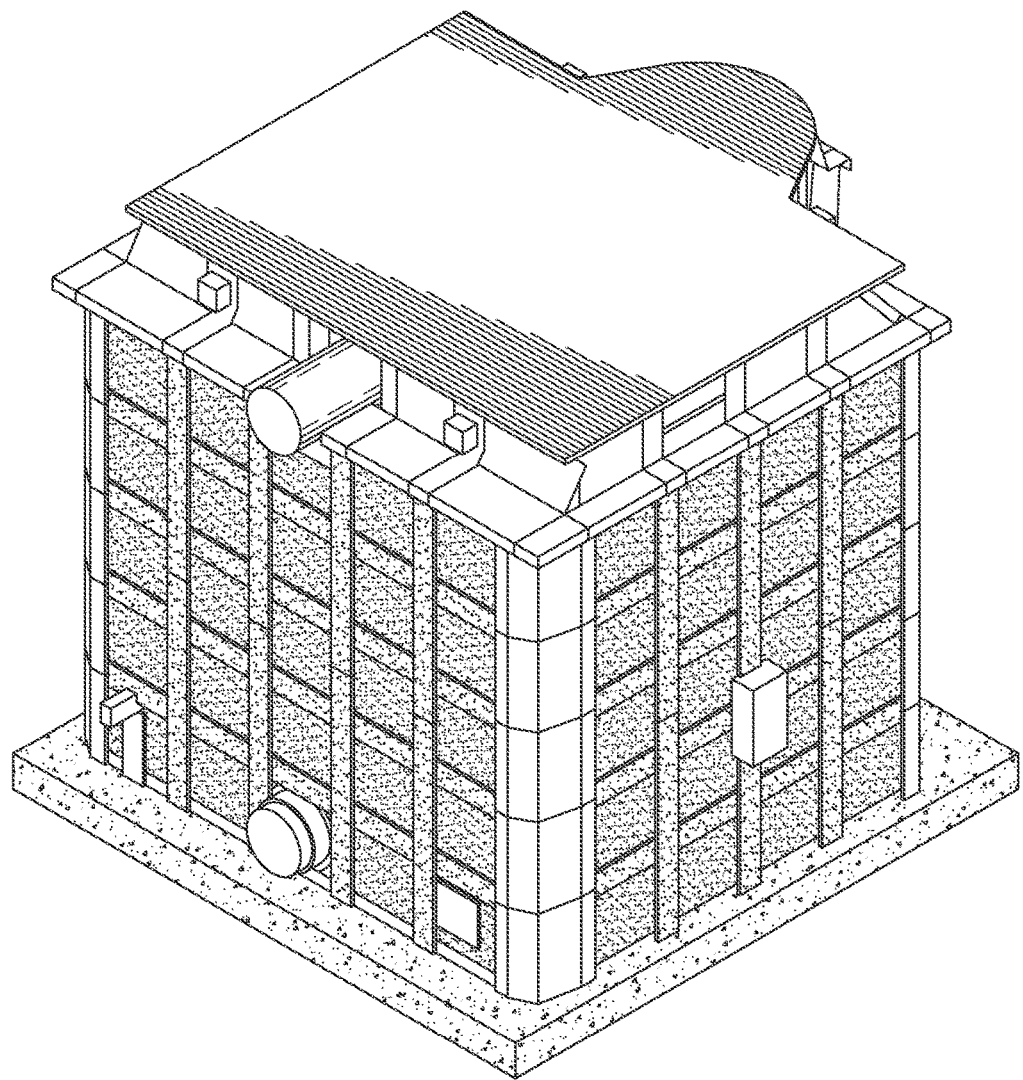

FIGS. 9A and 9B illustrate the case of a cradle (C) provided with a partial blanket enclosure, on one side thereof only for example, according to an embodiment of an aspect of the present invention. FIGS. 9B and 9D illustrate the case of a piece of equipment provided with a complete blanket enclosure, i.e. on all sides thereof, according to an embodiment of an aspect of the present invention.

Figure 10:
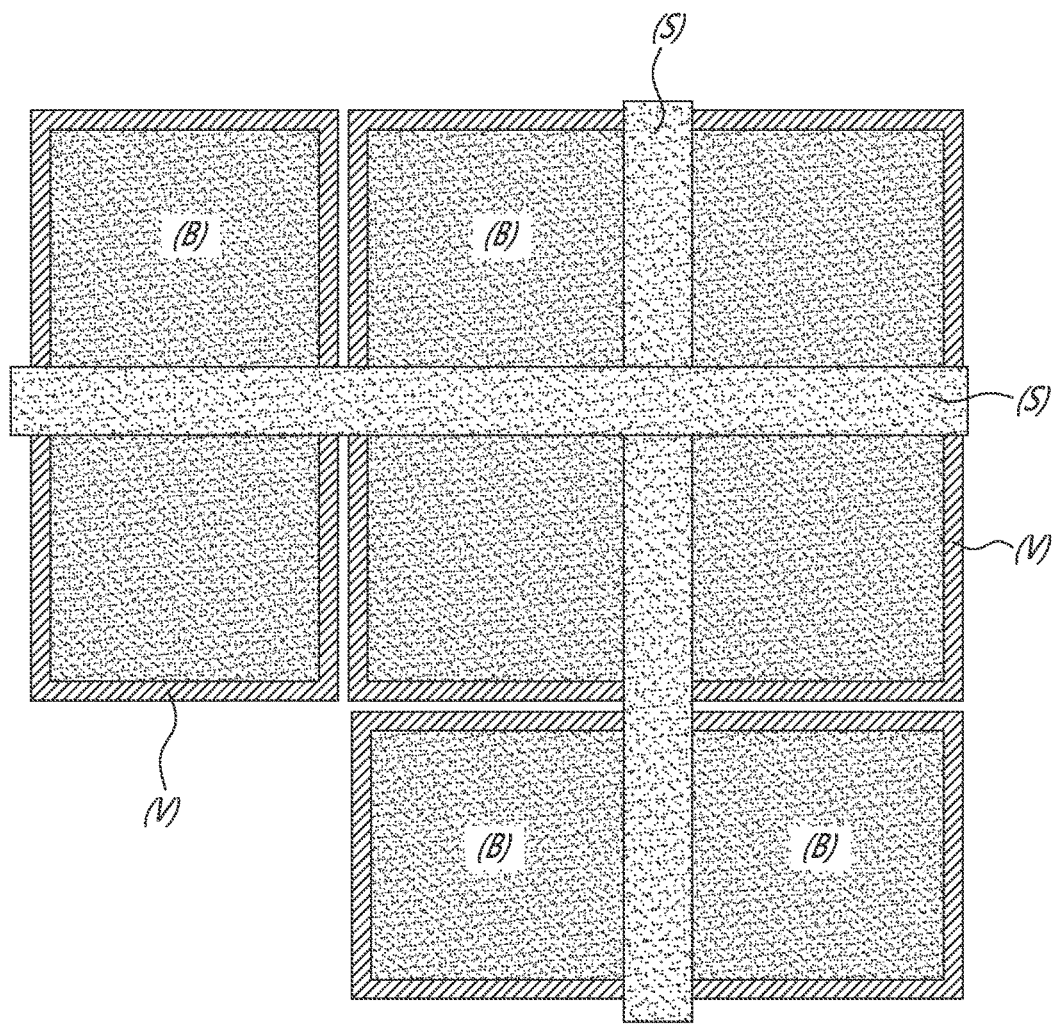
FIG. 10 shows an assembly of blanket panels according to an embodiment of an aspect of the present invention.

Once blanket panels are assembled and supported using supports as described herein gaps that may occur between blanket panels may be sealed using strips (S) of acoustical material with high transmission loss, i.e. material including an inner heavier mass layer, added to overlap the panel edges, as shown in FIG. 10. FIG. 10 shows an example of how strips (S) of acoustical materiel can be fixed on the blankets (B) using Velcro™ bands (V) for example.

Figures 11B, 11C:
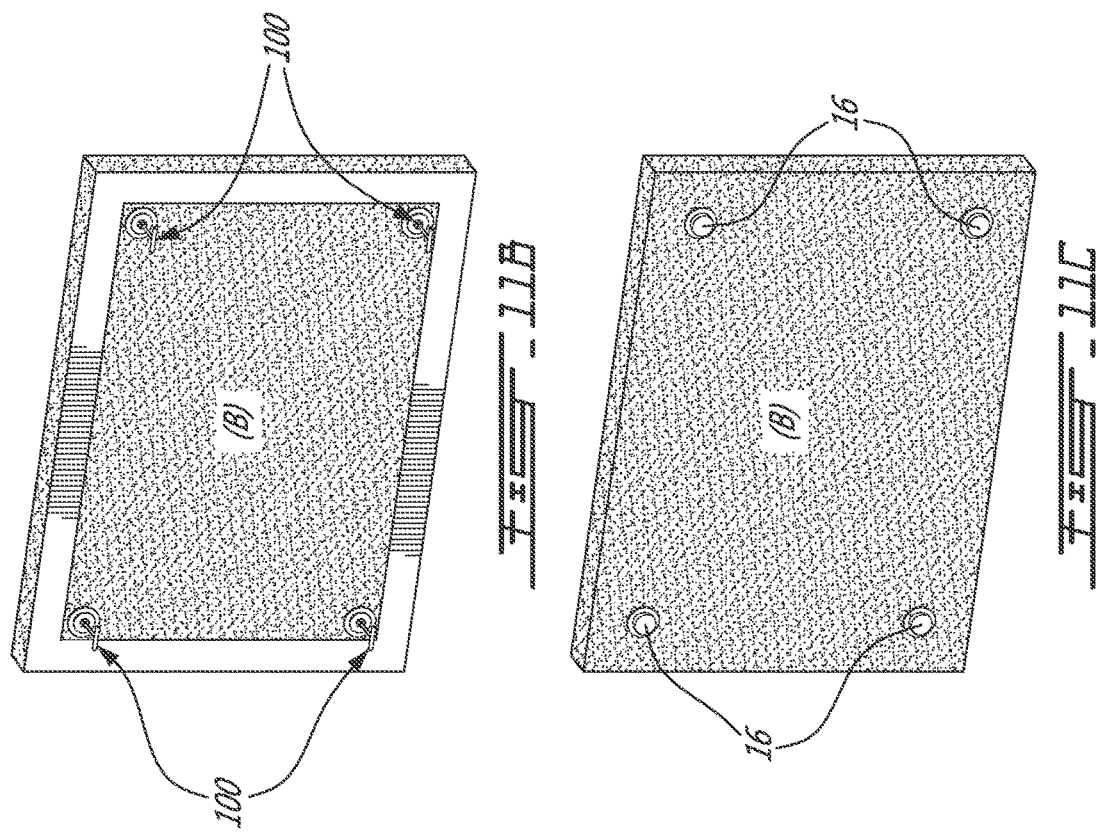
FIG. 11B is a perspective view of a blanket panel showing an outer face thereof.
FIG. 11C is a perspective view of the blanket panel of FIG. 11B showing an inner face.
Figure 11A:
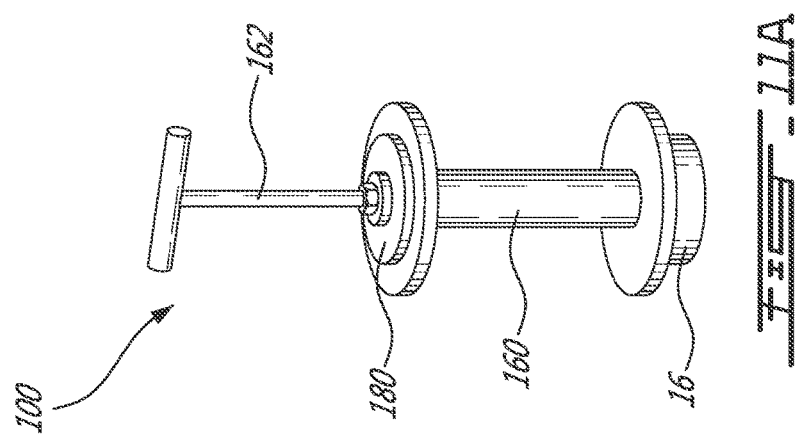
FIG. 11A shows a support according to an embodiment of an aspect of the present invention.

FIG. 11A illustrates a support 100 according to another embodiment of an aspect of the present invention. The support 100 comprises a rod 160. As shown in FIG. 11A, a support 100 is secured at each corner of a blanket panel (B), by, for each support, first inserting the rod 160 directly through the material of the blanket panel (B) from one side of the blanket panel (B). A nut and washer unit 180 may be provided in abutment with this first side of the blanket panel (B). A magnet 16 is then secured at the opposite end of the rod 160 emerging on the opposite side of the blanket panel (B), thereby completing the support 100.

As shown in FIG. 11C, the magnets 16 of the supports 100 are thus available for being positioned in direct contact with the metal surface of the machine or supporting structure to be covered, and held thereon in place by magnetic force. The magnets 16 are selected so as to be able to support the weight of the segment of the blanket panel (B).

The rod may be separated from direct contact with the blanket panel (B) by using a resilient material covering it, and resilient bushings and resilient sleeves may be used to prevent the transfer of structure-borne noise through the support to the outer surface of the blanket panel. A resilient material around any interconnecting rod passing through the layers of the blanket panel may be used to decouple the support from the layers of the blanket panel. Resilient or anti-vibration bushings may be used to reduce structure-borne sound transfer to the layers of the blanket panel.

A grasping element, such as a removable handle 162, removably attached via a threaded hole through the center of the rod 160 for example, or a ring (not shown), may be provided on the end of the rod 160 opposite the end thereof intended to receive the magnet 16, so as to facilitate handling of the rod 160 when positioning the support 100 in place on the blanket panel as discussed hereinabove.

FIG. 12A shows a support 115 according to another embodiment of an aspect of the present invention. As shown in FIGS. 12B and 12C, the support 115, a comprises a rod 160 with a first nut and washer unit 180 at a first end thereof, and a second nut and washer unit 180 that may be fixed at the emerging end of the rod 160 once the rod 160 is inserted through the panel blanket (B) from a first side thereof. The support 115 further comprises an extension rod 112 of adjustable length extending from this emerging end of the rod 160, and which supports a plate 111 supporting, in the illustrated example, two magnets 16. The extension rod 112 of adjustable length allows selecting a distance between the blanket panel (B) and the magnets 16 themselves, i. e. between the blanket panel (B) and the equipment, so that the blanket panel (B) can be offset from the machine (see distance (I)) if an air space between the equipment and the blanket is required.

As shown in FIG. 13, blanket panels (B) assembled using the support of FIG. 11 or 12 for example may overlap and be connected with Velcro™ strip (V) for example. Alternatively, strips of magnetic tapes or adhesive tapes for example may be used.

The present invention therefore provides magnetically securing blanket panels on sides of a machine, which would otherwise radiate internally generated sound towards a noise-sensitive receptor or alternatively a significant reflecting surface, thereby forming a continuous sound barrier enclosure, partial or complete, while allowing access for wiring, ventilation ducts or heat-radiator fins as required for example.

Alternatively, the blanket panels can be secured to a purpose-built or existing metal frame around the machine, using supports as described herein.

Thus magnetically securing blanket panels for noise-reduction in close proximity to the machinery or external structure of electrical equipment removes the need for significantly more expensive or massive noise barriers or enclosures, which are sometimes provided around commercial and industrial machinery or electrical noise sources in an attempt to reduce noise at adjacent noise-sensitive areas.

The adjustable distance between the acoustic blanket panels and the source of noise also allows more of the sound energy to be absorbed in comparison to standard absorptive barriers, due to less beam spread of the acoustic waves.

The present support allows forming continuous or segmented blanket barriers, and allows the blanket barriers to be either in direct contact with the machine or with an air space maintained between the machine and the blanket barriers.

There is provided a method comprising using magnets to maintain blanket panels in place about a metallic piece of equipment. The present magnet supports can take a number of forms capable of supporting the weight of the blanket panels. The number of magnets and their forces may be selected so as to support the weight of the blanket panels. Strong magnets, such as neodymium magnets for example, may be used when heavy blanket panels are used.

The present support and assembly of blanket panels are effective, robust, portable, reusable, and rapidly installed.

The present acoustic enclosure is more effective than standard noise barriers which suffer from the diffraction of sound. Indeed, as known in acoustics, diffraction of the noise increases with the distance from the source of noise. Acoustical barriers are generally located at a certain distance of the noise source, typically 3 feet or more, to allow access to the machinery. In contrast, the present system and method allow building an acoustic enclosure very close to the source of noise, thereby minimizing diffraction of sound and yielding an optimized acoustic barrier. Moreover, the present system and method allow making a complete enclosure over the source of noise.

In the case of standard massive barriers, a minimum distance between the barrier and the piece of equipment is needed to allow access thereto. For example, concrete or metallic massive acoustic enclosures are typically positioned at at least 1, 5 meters from an electric transformer to allow access to the transformer.

Individual blanket panel dimensions may be tailored to match the dimensions of each piece of machinery or equipment, or part thereof, to allow for a segmented, modular, blanket enclosure structure. This also allows fitting of the acoustic blanket enclosure in direct contact with the metallic external components of the source of noise if needed, whilst allowing passage for components, such as heat-radiator fins which are not covered by the acoustic enclosure, or to accommodate access for wiring.

As individual panels of blanket can be rapidly removed due to the smaller size of each panel and the magnetic supports of the present invention, there are no access problems even though the enclosure can be positioned in close proximity to immovable equipment which requires periodic servicing.

The present support and assembly remove the need for a separate anchoring foundation to be constructed for an acoustic, or thermal, enclosure.

In the case of acoustic blanket panels, the present support and assembly of blanket panels typically allow a noise reduction of machinery noise of between 3 dB and 50 dB depending on frequency. The blanket panels may further be selected to be resistant to degradation from temperature, oils and UV light.

The scope of the claims should not be limited by the illustrated embodiments set forth in the examples, but should be given the broadest interpretation consistent with the description as a whole.

The invention claimed is:

1. An enclosure unit reducing noise breakout from a piece of machinery, comprising:
   at least one acoustic blanket; and
   at least one support, said at least one support comprising vertical plates supporting at least one bracket on a first side thereof and at least one magnet on a second side thereof, said at least one bracket supporting the at least one acoustic blanket generally parallel to said vertical plates on said first side and said at least one magnet connecting said at least one support to a metallic surface of the piece of machinery on said second side, a distance between said second side and said at least one magnet being adjustable, by using one of an extended nut and an extended arm, to adjust to a target distance between the at least one acoustic blanket of the enclosure unit and the metallic surface of the piece of machinery;
   wherein the enclosure unit reduces the noise breakout from the piece of machinery by between 3 dB and 50 dB.

2. The enclosure unit of claim 1, wherein said at least one support comprises two vertical plates and at least one cross bar between the two vertical plates.

3. The enclosure unit of claim 1, wherein said at least one bracket is positioned at a bottom end of the at least one vertical plate, and said at least one bracket supports the at least one acoustic blanket by a bottom edge of the at least one acoustic blanket.

4. The enclosure unit of claim 1, wherein said at least one bracket is positioned at a bottom end of the at least one vertical plate, and said at least one bracket supports the at least one acoustic blanket by a bottom edge of the at least one acoustic blanket, lateral edges of the at least one acoustic blanket resting against said first side of the at least one vertical plate.

5. The enclosure unit of claim 1, wherein the at least one acoustic blanket is further secured to said at least one vertical plate by a top edge of the at least one acoustic blanket.

6. The enclosure unit of claim 1, wherein said at least one vertical plate comprises on said first side two brackets separated along a height thereof by a distance equal to a height of the at least one acoustic blanket, a bottom end of the at least one acoustic blanket being supported by a bottom one of said two brackets and a top edge of the at least one acoustic blanket being secured by a top one of said two brackets.

7. A method for reducing noise breakout from a piece of machinery, comprising:
providing at least one acoustic blanket;
providing at least one support comprising at least one vertical plate supporting at least one bracket on a first side thereof and at least one magnet on a second side thereof, a distance between the second side and the at least one magnet being adjustable by using one of an extended nut and an extended arm;
connecting the at least one support to a metallic surface of the piece of machinery by the at least one magnet and supporting the at least one acoustic blanket generally parallel to the at least one vertical plate by the at least one bracket; and
adjusting a distance between the at least one acoustic blanket and the metallic surface of the piece of machinery by adjusting the distance between the second side of the at least one vertical plate and the at least one magnet;
thereby reducing the noise breakout from the piece of machinery by between 3 dB and 50 dB.

8. The method of claim 7, wherein the at least one support comprises two vertical plates and a cross bar between the two vertical plates.

9. The method of claim 7, wherein the at least one bracket is positioned at a bottom end of the at least one vertical plate, and the at least one bracket supports the at least one acoustic blanket by a bottom edge of the at least one acoustic blanket.

10. The method of claim 7, wherein the at least one bracket is positioned at a bottom end of the at least one vertical plate, and the at least one bracket supports the at least one acoustic blanket by a bottom edge of the at least one acoustic blanket, lateral edges of the at least one acoustic blanket resting against the first side of the at least one vertical plate.

11. The method of claim 7, further comprising securing the at least one acoustic blanket to the vertical plates by a top edge of the at least one acoustic blanket.

12. The method of claim 7, wherein the at least one vertical plate comprises on the first side two brackets separated along a height thereof by a distance equal to a height of the at least one acoustic blanket, a bottom end of the at least one acoustic blanket being supported by a bottom one of the brackets and a top edge of the at least one acoustic blanket being secured by a top one of the brackets.

* * * * *